(12) United States Patent
Tsunashima et al.

(10) Patent No.: US 9,964,163 B2
(45) Date of Patent: May 8, 2018

(54) METHOD OF CONTROLLING ELECTRIC CURRENT OF LINEAR SOLENOID VALVE

(71) Applicant: HONDA MOTOR CO., LTD., Tokyo (JP)

(72) Inventors: Kosuke Tsunashima, Wako (JP); Toshimitsu Nakajima, Wako (JP); Naoki Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/448,836

(22) Filed: Mar. 3, 2017

(65) Prior Publication Data
US 2017/0284485 A1 Oct. 5, 2017

(30) Foreign Application Priority Data

Mar. 31, 2016 (JP) .................................. 2016-071851

(51) Int. Cl.
*F16D 33/02* (2006.01)
*F16D 48/06* (2006.01)
(52) U.S. Cl.
CPC ........... *F16D 48/064* (2013.01); *F16D 33/02* (2013.01); *F16D 2500/10412* (2013.01); *F16D 2500/10487* (2013.01); *F16D 2500/1117* (2013.01); *F16D 2500/7109* (2013.01)
(58) Field of Classification Search
None
See application file for complete search history.

(56) References Cited

U.S. PATENT DOCUMENTS

| | | | | |
|---|---|---|---|---|
| 4,485,424 A * | 11/1984 | Niwa | ...................... | H01F 7/064 307/132 E |
| 4,527,678 A * | 7/1985 | Pierce | ..................... | F16D 43/28 192/3.58 |
| 4,535,879 A * | 8/1985 | Sturges | ................. | F16D 48/066 192/109 F |
| 6,364,813 B1 * | 4/2002 | Patel | ....................... | F16D 48/08 477/174 |
| 6,397,998 B1 * | 6/2002 | Wheeler | ............... | F16D 48/066 192/109 F |
| 8,235,868 B2 * | 8/2012 | Fukaya | ................. | F16D 48/066 477/127 |

FOREIGN PATENT DOCUMENTS

| | | | |
|---|---|---|---|
| EP | 1243806 A2 * | 9/2002 | ............ F16D 48/06 |
| JP | 2002-286057 | 10/2002 | |

* cited by examiner

*Primary Examiner* — Dirk Wright
(74) *Attorney, Agent, or Firm* — Rankin, Hill & Clark LLP

(57) ABSTRACT

A method of controlling the electric current of a linear solenoid valve by performing pulse width modulation on a coil current for energizing a linear solenoid of the linear solenoid valve to adjust the hydraulic pressure of a working oil in a hydraulic clutch for transmitting and interrupting the rotational drive power from a power source to a drive wheel of a vehicle. The method includes setting the period of the pulse width modulation to a shorter value as the degree to which the hydraulic clutch is engaged increases from a disengaged state thereof. Here, the period of the pulse width modulation may be set in accordance with the variation of a duty ratio depending on the hydraulic pressure corresponding to the degree to which the hydraulic clutch is engaged.

6 Claims, 12 Drawing Sheets

Fig.7

NORMALLY CLOSED LINEAR SOLENOIDS

CLUTCHE DISENGAGED STATE ↕ CLUTCHE ENGAGED STATE

| HYDRAULIC PRESSURE | DUTY RATIOS | PWM PERIODS |
|---|---|---|
| LOW | LOW | LONG (5.0ms, 200Hz) |
| MEDIUM | MEDIUM | MEDIUM (2.5ms, 400Hz) |
| HIGH | HIGH | SHORT (1.25ms, 800Hz) |

Fig.8

| PWM PERIODS | ADVANTAGE | DISADVANTAGE | HYDRAULIC PRESSURE FLUCTUATIONS |
|---|---|---|---|
| LONG (PWM FREQUENCY LOW) | COIL DRIVE CURRENTS RISES QUICKLY | LARGE AMPLITUDE OF COIL DRIVE CURRENTS (UNSTABLE) | BIG INFLUENCE |
| SHORT (PWM FREQUENCY HIGH) | SMALL AMPLITUDE OF COIL DRIVE CURRENTS (STABLE) | COIL DRIVE CURRENTS RISES SLOWLY | SMALL INFLUENCE |

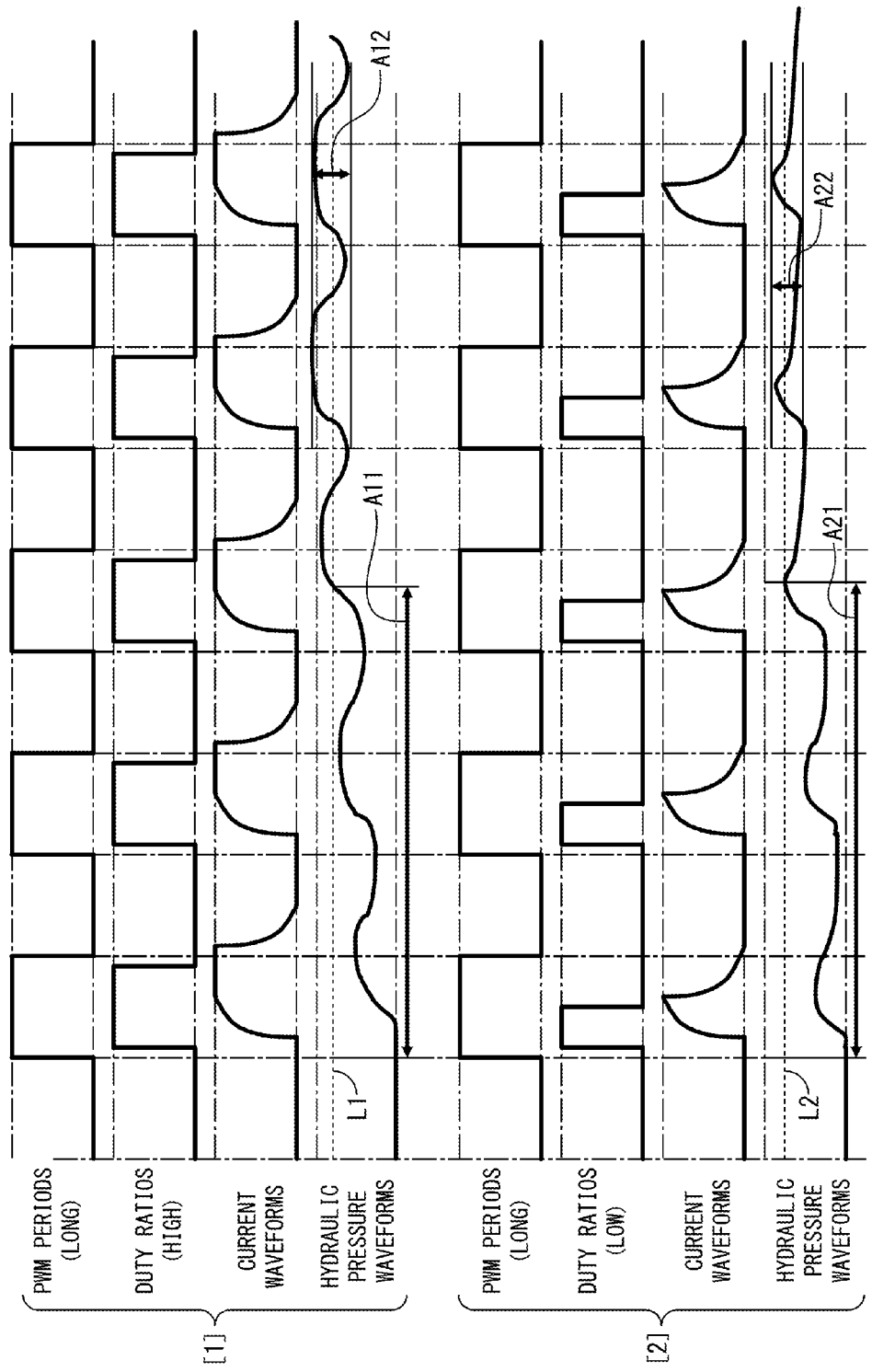

NORMALLY OPEN LINEAR SOLENOIDS

| | HYDRAULIC PRESSURE | DUTY RATIOS | PWM PERIODS |
|---|---|---|---|
| CLUTCHE DISENGAGED STATE ↕ CLUTCHE ENGAGED STATE | LOW | HIGH | LONG (5.0ms, 200Hz) |
| | MEDIUM | MEDIUM | MEDIUM (2.5ms, 400Hz) |
| | HIGH | LOW | SHORT (1.25ms, 800Hz) |

METHOD OF CONTROLLING ELECTRIC CURRENT OF LINEAR SOLENOID VALVE

TECHNICAL FIELD

The present invention relates to a method of controlling the electric current of a linear solenoid valve which regulates the pressure of working oil in a hydraulic clutch, and more particularly to a method of controlling the electric current of a linear solenoid valve for achieving good hydraulic pressure control while making a pulse width modulation (PWM) period variable.

BACKGROUND ART

Patent Document 1 discloses, with respect to a procedure for engaging and disengaging a wet-type frictional clutch provided in the power transmitting system of a vehicle by changing the pressure of a working fluid supplied to the clutch depending on the duty pulse output from an electronic control unit, a technology for engaging the clutch from a disengaged state by initially outputting from the electronic control unit a predetermined starting duty ratio with which to engage the clutch to a large extent until it starts to connect driving and driven members, and thereafter outputting from the electronic control unit a predetermined gradually engaging duty ratio with which to gradually engage the clutch, in every given period of time.

CITATION LIST

Patent Literature

Patent Document 1: JP 2002-286057 A

SUMMARY OF INVENTION

Technical Problem

According to the conventional technology described above, although the duty ratio at the time of engaging the clutch is varied, nothing is referred to concerning a PWM period, but a constant PWM period is employed. Using a constant PWM period poses problems (1) and (2) described below, which the conventional technology has failed to deal with.

(1) If a constant PWM period is set to a short period, then the time required to reach a target hydraulic pressure becomes long, resulting in a long clutch engagement time.

(2) Conversely, if a constant PWM period is set to a long period, then the time required to reach a target hydraulic pressure becomes short, but the amplitude for a target hydraulic pressure increases, causing large hydraulic pressure variations.

It is an object of the present invention to solve the problems of the conventional technology and provide a method of controlling the electric current of a linear solenoid valve for achieving good hydraulic pressure control while making a PWM period variable.

Solution to Problems

To achieve the afore-mentioned object, the present invention has a first feature in a method of controlling an electric current of a linear solenoid valve (107a, 107b) by performing pulse width modulation on a coil current for energizing a linear solenoid of the linear solenoid valve which is open when energized to adjust the hydraulic pressure of a working oil in a hydraulic clutch (CL1, CL2) for transmitting and interrupting rotational drive power from a power source (100) to a drive wheel (WR) of a vehicle, the method comprising: setting a duty ratio to a higher value and setting a period of the pulse width modulation to a shorter value (S31, S32, S33) as the degree to which said hydraulic clutch (CL1, CL2) is engaged increases from a disengaged state thereof.

The present invention has a second feature in a method of controlling an electric current of a normally open linear solenoid valve (107a, 107b) by performing pulse width modulation on a coil current for energizing a linear solenoid of the linear solenoid valve which is closed when energized to adjust the hydraulic pressure of a working oil in a hydraulic clutch (CL1, CL2) for transmitting and interrupting rotational drive power from a power source (100) to a drive wheel (WR) of a vehicle, the method comprising: setting a duty ratio to a lower value and setting a period of the pulse width modulation to a shorter value (S31, S32, S33) as the degree to which said hydraulic clutch (CL1, CL2) is engaged increases from a disengaged state thereof.

The present invention has a third feature in that said period of the pulse width modulation and said duty ratio are set depending on a hydraulic pressure of the working oil in the hydraulic clutch (CL1, CL2).

The present invention has a fourth feature in that said period of the pulse width modulation and said duty ratio are set stepwise to predetermined period values and duty ratio values in respective given ranges of the hydraulic pressure of the working oil in the hydraulic clutch (CL1, CL2).

The present invention has a fifth feature in that the period of the pulse width modulation which is set to the shorter value as the degree to which said hydraulic clutch (CL1, CL2) is engaged increases is set in synchronism with a predetermined control period in an electronic control unit which controls operation of said hydraulic clutch (CL1, CL2).

Advantageous Effects of Invention

According to the first feature, in a method of controlling an electric current of a linear solenoid valve (107a, 107b) by performing pulse width modulation on a coil current for energizing a linear solenoid of the linear solenoid valve which is open when energized to adjust the hydraulic pressure of a working oil in a hydraulic clutch (CL1, CL2) for transmitting and interrupting rotational drive power from a power source (100) to a drive wheel (WR) of a vehicle, the method comprises setting a duty ratio to a higher value and setting a period of the pulse width modulation to a shorter value (S31, S32, S33) as the degree to which said hydraulic clutch (CL1, CL2) is engaged increases from a disengaged state thereof. Therefore, it is possible to shorten the time required to engage the clutch and to minimize variations of the hydraulic pressure of the clutch.

According to the second feature, in a method of controlling an electric current of a normally open linear solenoid valve (107a, 107b) by performing pulse width modulation on a coil current for energizing a linear solenoid of the linear solenoid valve which is closed when energized to adjust the hydraulic pressure of a working oil in a hydraulic clutch (CL1, CL2) for transmitting and interrupting rotational drive power from a power source (100) to a drive wheel (WR) of a vehicle, the method comprises setting a duty ratio to a lower value and setting a period of the pulse width modulation to a shorter value (S31, S32, S33) as the degree to which said hydraulic clutch (CL1, CL2) is engaged increases from a disengaged state thereof. Therefore, it is possible to shorten the time required to engage the clutch and to minimize variations of the hydraulic pressure of the clutch.

According to the third feature, said period of the pulse width modulation and said duty ratio are set depending on a hydraulic pressure of the working oil in the hydraulic clutch (CL1, CL2). Therefore, by setting a PWM period and a duty ratio depending on the hydraulic pressure of the clutch, it is possible to minimize variations of the hydraulic pressure of the clutch while shortening the time required to engage the clutch.

According to the fourth feature, said period of the pulse width modulation and said duty ratio are set stepwise to predetermined period values and duty ratio values in respective given ranges of the hydraulic pressure of the working oil in the hydraulic clutch (CL1, CL2). Therefore, by setting PWM periods and duty ratios as table values for the hydraulic pressure of the clutch, it is possible to reduce the burden required by an arithmetic process for determining a PWM period and a duty ratio and to perform a quick process.

According to the fifth feature, the period of the pulse width modulation which is set to the shorter value as the degree to which said hydraulic clutch (CL1, CL2) is engaged increases is set in synchronism with a predetermined control period in an electronic control unit which controls operation of said hydraulic clutch (CL1, CL2). Therefore, the PWM period that is in synchronism with the control period of the electronic control unit are effective to increase control accuracy.

BRIEF DESCRIPTION OF DRAWINGS

FIG. 7 is a table for the control that the PWM period is longer as the hydraulic pressure is lower and the PWM period is shorter as the hydraulic pressure is higher.

FIG. 8 is a table of the characteristics available by changing the PWM periods of the coil drive currents for the linear solenoid valves.

FIG. 9 is a diagram showing an example in the case where the PWM period is set short.

DESCRIPTION OF EMBODIMENTS

Figure 1:
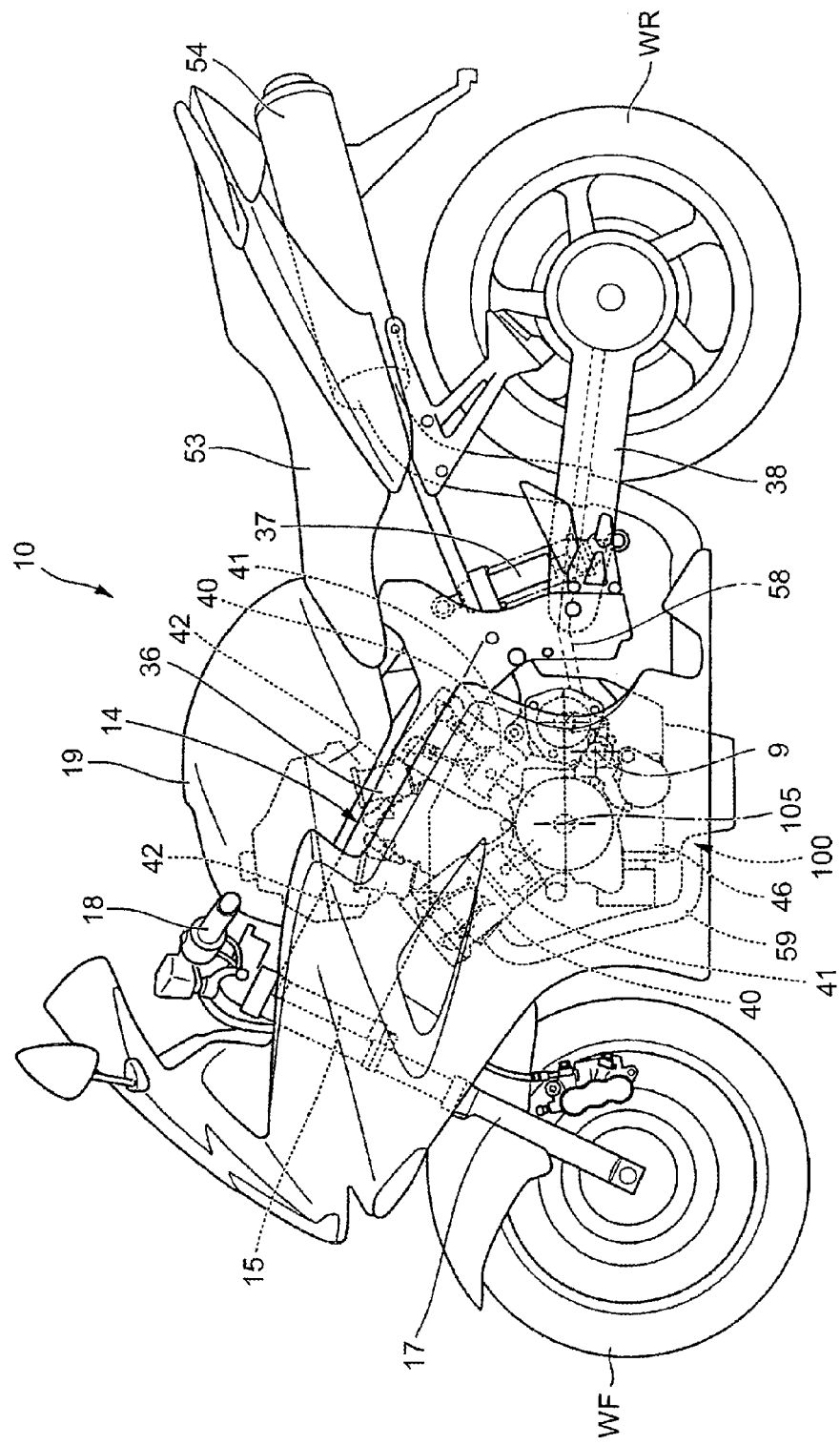
FIG. 1 is a side elevational view of a motorcycle which incorporates therein clutch control means to which a method of controlling the electric current of a linear solenoid valve according to an embodiment of the present invention is applied.
Figure 2:
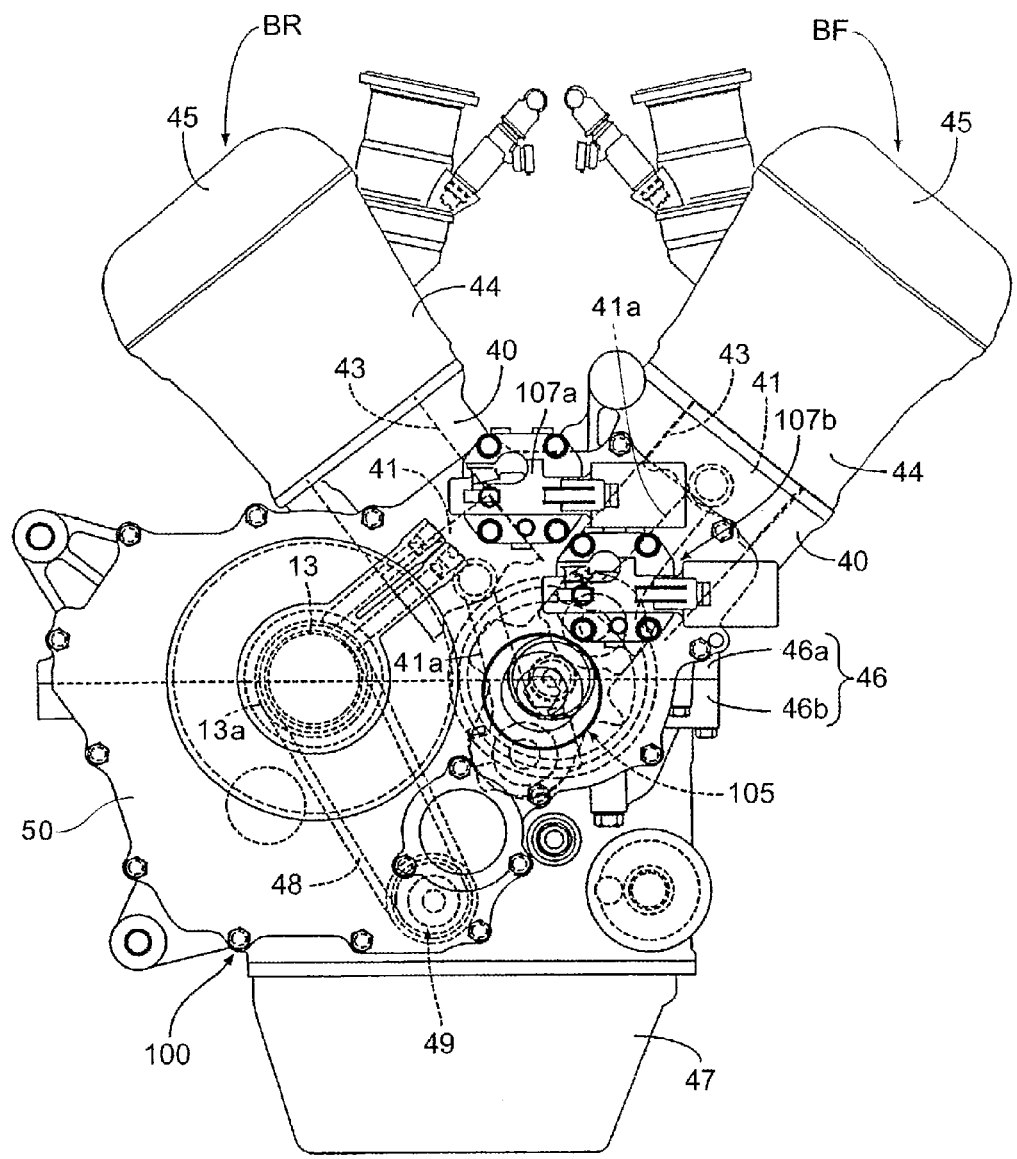
FIG. 2 is a left-hand side elevational view of an engine as a power source of the motorcycle.

Preferred embodiments of the present invention will be described in detail below with reference to the drawings. FIG. 1 is a side elevational view of a motorcycle 10 which incorporates therein clutch control means to which a method of controlling the electric current of a linear solenoid valve according to an embodiment of the present invention is applied. FIG. 2 is a left-hand side elevational view of an engine 100 as a power source of the motorcycle 10. The motorcycle 10 includes a vehicle body frame 14 having a pair of left and right main pipes 36 and a head pipe 15 positioned forwardly of the main pipes 36 with respect to the longitudinal directions of the motorcycle 10. A front wheel WF is rotatably mounted on a pair of left and right front forks 17 that support a steering handle 18 and which are angularly movably supported by the head pipe 15.

The engine 100, which is disposed below and suspended by the main pipes 36, includes a V-type four-cylinder engine including front and rear pairs of cylinders 43 angularly spaced from each other by a predetermined angle. The engine 100 has front and rear cylinder blocks 40 housing therein the four front and rear cylinders 43 with respective slidable pistons 41 therein and valve operating mechanisms. The pistons 41 and the valve operating mechanisms are identical in structure for the four cylinders 43. The engine 100 also has a crankcase 46 housing therein a crankshaft 105 by which connecting rods 41a (see FIG. 2) that support the pistons 41 are rotatably supported, and a main shaft 13 and a countershaft 9 on which a plurality of gear pairs are mounted, making up a gear transmission.

Between the front and rear cylinder blocks 40, there are disposed air funnels 42 for introducing fresh air that has passed through an air cleaner box disposed below a fuel tank 19 into respective inlet ports of the cylinders. Fuel injection valves are mounted in the respective air funnels 42. A muffler 54 for discharging combustion gases guided rearwardly with respect to the longitudinal direction of the motorcycle 10 by an exhaust pipe 59 connected to respective exhaust ports of the cylinders is disposed below a rider's seat 53.

A rear wheel WR is rotatably supported by a swing arm 38 that is suspended by a shock absorber unit 37 and which is swingably supported by rear lower portions of the main pipes 36. The swing arm 38 accommodates therein a drive shaft 58 for transmitting rotational drive power of the engine 100 from the countershaft 9 to the rear wheel WR that serves as the drive wheel of the motorcycle 10.

As shown in FIG. 2, the engine 100 has a front bank BF and a rear bank BR each including a cylinder head 44 mounted on an upper portion of the corresponding front cylinder block 40 and housing the corresponding valve operating mechanisms and a head cover 45 covering the upper end of the cylinder head 44. The pistons 41 are slidably disposed in the cylinders 43 that are defined in the cylinder blocks 40. The crankcase 46 includes an upper case member 46a integrally formed with the cylinder blocks 40 and a lower case member 46b joined to the lower end of the upper case member 46a and having a lower end to which an oil pan 47 is attached. A water pump 49 for delivering a coolant under pressure to the engine 100 is actuated by an endless chain 48 trained around a sprocket 13a mounted on the main shaft 13. A clutch cover 50 is mounted on a right side surface of the crankcase 46 with respect to the transverse directions of the motorcycle 10.

According to the present embodiment, the engine 100 has a twin-type hydraulic clutch having a first clutch and a second clutch for selectively transmitting and interrupting rotational drive power between the engine 100 and the gear transmission, and an actuator for controlling a hydraulic pressure supplied to actuate the first and second clutches. The actuator includes a first valve 107a and a second valve 107b mounted on a left side of the engine 100. Structural details of the gear transmission that is combined with the twin-type hydraulic clutch will be described later.

Figure 3:
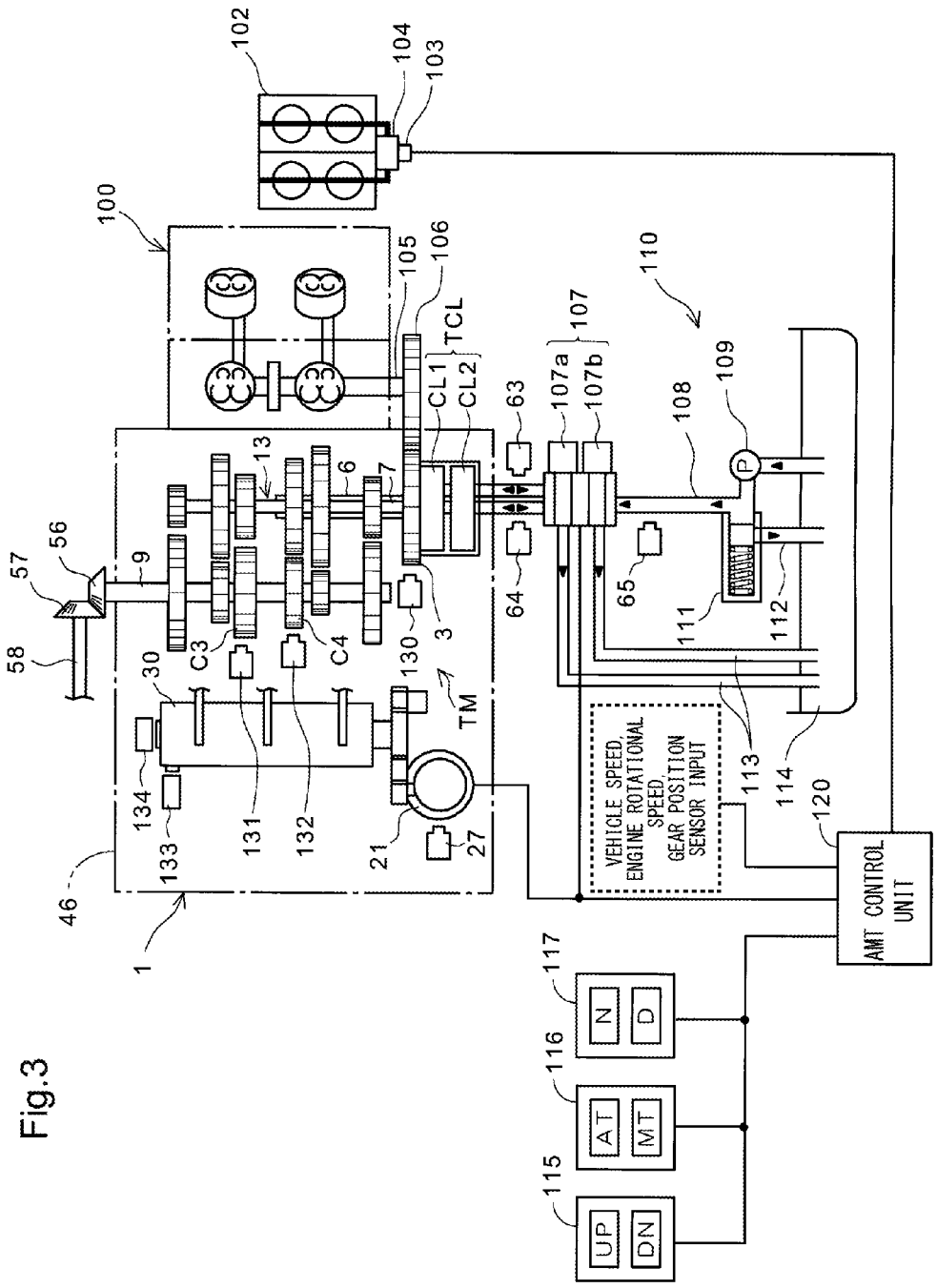
FIG. 3 is a systematic diagram of an automatic manual transmission (hereinafter referred to as "AMT") as a type of automatic transmission and peripheral devices.

FIG. 3 is a systematic diagram of an automatic manual transmission (hereinafter referred to as "AMT") 1 as a type of automatic transmission and peripheral devices. The AMT 1 is arranged as a twin-clutch transmission for selectively transmitting and interrupting rotational drive power from the engine 100 with two clutches mounted on the main shaft 13. The AMT 1, which is housed in the crankcase 46, is actuated and controlled by a clutch hydraulic pressure device 110 and an AMT control unit 120. The AMT control unit 120 includes clutch control means for actuating and controlling the first valve 107a and the second valve 107b. The engine 100 has a throttle-by-wire throttle body 102 combined with an electric motor 104 for opening and closing throttle valves in the throttle-by-wire throttle body 102.

The AMT 1 includes a gear transmission TM with six forward gear positions, a twin clutch assembly TCL having a first clutch CL1 and a second clutch CL2, a shift drum 30, and a shift control motor 21 for angularly moving the shift drum 30 around its own axis. The gear transmission TM includes a number of transmission gears fixedly mounted or rotatably fitted over the main shaft 13 and the countershaft 9. The main shaft 13 includes an inner main shaft 7 and an outer main shaft 6 fitted over the inner main shaft 7. The inner main shaft 7 is coupled at one end thereof to the first clutch CL1 and the outer main shaft 6 is coupled at one end thereof to the second clutch CL2. Transmission gears that are displaceable axially with respect to the main shaft 13 and the countershaft 9 are mounted on the main shaft 13 and the countershaft 9. Shift forks 71, 72, 81, and 82 (see FIG. 5) have ends engaging in respective guide grooves defined in the transmission gears and the shift drum 30.

A primary drive gear 106 is coupled to an end of the output shaft, i.e., the crankshaft 105, of the engine 100, and is held in driving mesh with a primary driven gear 3. The primary driven gear 3 is connected to the inner main shaft 7 through the first clutch CL1 and is also connected to the outer main shaft 6 through the second clutch CL2. The AMT 1 also includes an inner main shaft rotational speed sensor 131 and an outer main shaft rotational speed sensor 132 for detecting the respective rotational speeds of the inner main shaft 7 and the outer main shaft 6 by measuring the rotational speeds of predetermined transmission gears on the countershaft 9.

The inner main shaft rotational speed sensor 131 detects the rotational speed of a driven transmission gear C3 which is held in mesh with a transmission gear non-rotatably mounted on the inner main shaft 7 and which is rotatably and non-slidably mounted on the countershaft 9. The outer main shaft rotational speed sensor 132 detects the rotational speed of a driven transmission gear C4 which is held in mesh with a transmission gear non-rotatably mounted on the outer main shaft 6 and which is rotatably and non-slidably mounted on the countershaft 9. Details of the gear trains on the shafts will be described later.

A bevel gear 56 is mounted on an end of the countershaft 9 and held in mesh with a bevel gear 57 coupled to the drive shaft 58 for thereby transmitting the rotational drive power from the countershaft 9 to the rear wheel WR. The AMT 1 further includes an engine rotational speed sensor 130 disposed in facing relation to the outer circumferential surface of the primary driven gear 3, a gear position sensor 134 for detecting a gear position of the gear transmission TM based on an angular position of the shift drum 30, a shifter sensor 27 for detecting an angular position of a shifter that is actuated by the shift control motor 21, and a neutral switch 133 for detecting when the shift drum 30 is in a neutral position. The throttle body 102 is provided with a throttle opening sensor 103 for detecting the opening of the throttle valves.

The clutch hydraulic pressure device 110 according to the present embodiment uses an oil doubling as both a lubricating oil for lubricating the engine 100 and a working oil for actuating the twin clutch assembly TCL. The clutch hydraulic pressure device 110 is provided with an oil tank 114 and a pipe 108 for supplying the oil (working oil) from the oil tank 114 to the first clutch CL1 and the second clutch CL2. The pipe 108 is connected to a hydraulic pump 109 as a hydraulic pressure source and a normally closed linear solenoid valve (hereinafter also referred to as "valve") 107 which operates to open when energized as an actuator. A regulator 111 for keeping the hydraulic pressure supplied to the valve 107 at a constant level is connected to a return pipe 112 extending from the pipe 108 to the oil tank 114. The valve 107 includes the first valve 107a and the second valve 107b, referred to above, for applying the hydraulic pressure individually to the first clutch CL1 and the second clutch CL2. The first valve 107a and the second valve 107b are connected to the oil tank 114 by respective return pipes 113.

The first valve 107a and the first clutch CL1 are interconnected by a pipe provided with a first hydraulic pressure sensor 63 for measuring a hydraulic pressure developed in the pipe, i.e., a hydraulic pressure developed in the first clutch CL1. Similarly, the second valve 107b and the second clutch CL2 are interconnected by a pipe provided with a second hydraulic pressure sensor 64 for measuring a hydraulic pressure developed in the second clutch CL2. The pipe 108 that interconnects the hydraulic pump 109 and the valve 107 is provided with a main hydraulic pressure sensor 65.

To the AMT control unit 120, there are connected a mode switch 116 for switching between an automatic transmission (AT) mode and a manual transmission (MT) mode, a shift selector switch 115 for instructing the gear transmission TM to shift up (UP) gear positions or shift down (DN) gear positions, and a neutral selector switch 117 for switching between a neutral (N) position and a drive (D) position. The AMT control unit 120 has a central processing unit (CPU) for controlling the valve 107 and the shift control motor 21 depending on output signals from the above sensors and switches to change gear positions of the AMT1 automatically or semi-automatically.

When the AT mode is selected, the AMT control unit 120 automatically changes gear positions depending on the information representing a vehicle speed, an engine rotational speed, a throttle opening, etc. When the MT mode is selected, the AMT control unit 120 shifts up or shifts down the gear transmission TM depending on an action on the shift selector switch 115. Even when the MT mode is selected, the AMT control unit 120 can perform auxiliary automatic transmission control in order to prevent the engine 100 from overspeeding or stalling.

In the clutch hydraulic pressure device 110, the hydraulic pump 109 applies a hydraulic pressure to the valve 107, and the hydraulic pressure is controlled by the regulator 111 so as not to exceed an upper limit value. When the valve 107 is opened by an instruction signal from the AMT control unit 120, the hydraulic pressure is applied to the first clutch CL1 or the second clutch CL2, through which the primary driven gear 3 is connected to the inner main shaft 7 or the outer main shaft 6. When the valve 107 is closed to stop applying the hydraulic pressure, the first clutch CL1 and the second clutch CL2 are urged by a return spring, not shown, incorporated therein to disconnect the primary driven gear 3 from the inner main shaft 7 and the outer main shaft 6.

The valve 107 actuates the first and second clutches CL1 and CL2 by opening and closing the pipes that interconnect the pipe 108 and the first and second clutches CL1 and CL2. The AMT control unit 120 adjusts drive signals, i.e., drive currents, to be supplied to the valve 107 for thereby varying the period of time from a fully closed state to a fully open state of the pipes that interconnect the pipe 108 and the first and second clutches CL1 and CL2. As described above, the AMT control unit 120 is capable of carrying out the method of controlling the electric current of the linear solenoid valve 107 according to the present invention.

The shift control motor 21 angularly moves, i.e. turns, the shift drum 30 around its own axis according to an instruction signal from the AMT control unit 120. When the shift drum 30 is angularly moved, the shift forks are displaced axially of the shift drum 30 according to the configurations of the guide grooves defined on the outer circumferential surface of the shift drum 30. The transmission gears on the countershaft 9 and the main shaft 13 mesh with each other in different combinations, making it possible to shift up or down the gear transmission TM.

The AMT 1 is constructed such that the inner main shaft 7 that is coupled to the first clutch CL1 supports odd-numbered gear-position transmission gears (first, third, fifth gear positions), and the outer main shaft 6 that is coupled to the second clutch CL2 supports even-numbered gear-position transmission gears (second, fourth, sixth gear positions). While the motorcycle 10 is traveling in an odd-numbered gear position, the hydraulic pressure is continuously supplied to the first clutch CL1 to keep the first clutch CL1 engaged. When the AMT 1 is to shift the odd-numbered gear position to another even-numbered gear position, the shift drum 30 is angularly moved to change meshed gear combinations in advance, so that the AMT 1 can change to the other even-numbered gear position simply by disengaging the first clutch CL1 and engaging the second clutch CL2.

Figure 4:
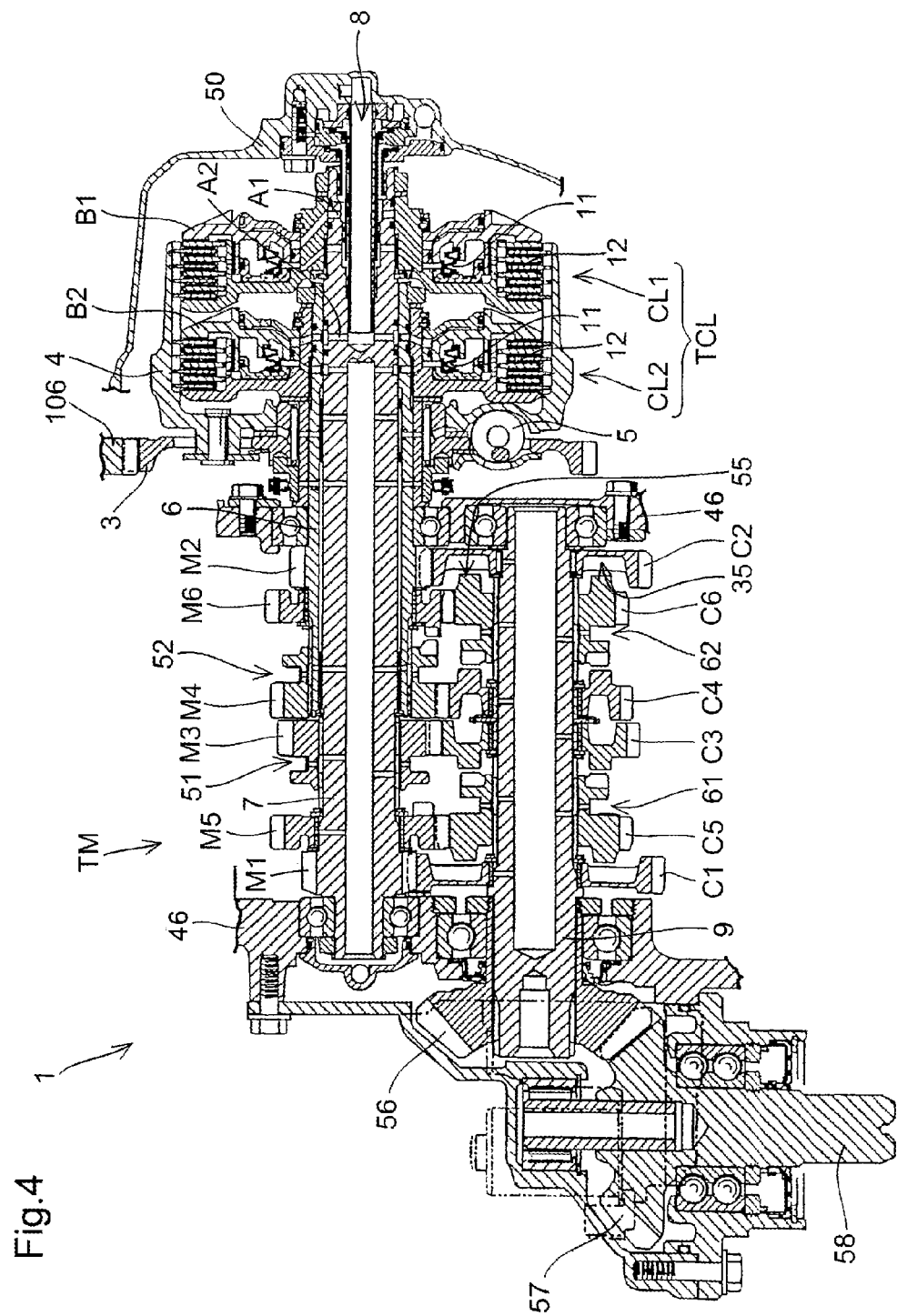
FIG. 4 is an enlarged cross-sectional view of the gear transmission TM.

FIG. 4 is an enlarged cross-sectional view of the gear transmission TM. Those reference symbols shown in FIG. 4 which are identical to those shown in FIGS. 1 through 3 denote identical or similar parts. The rotational drive power that has been transmitted from the crankshaft 105 of the engine 100 through the primary drive gear 106 to the primary driven gear 3 which is provided with a shock absorbing mechanism 5 is transmitted from the twin clutch assembly TCL to the countershaft 9 on which the bevel gear 56 is mounted, through the main shaft 13, which includes the outer main shaft 6 and the inner main shaft 7 rotatably supported in the outer main shaft 6, and six pairs of transmission gears mounted on the main shaft 13 and the countershaft 9. The rotational drive power is transmitted to the bevel gear 56 and then to the bevel gear 57 held in mesh with the bevel gear 56, changing its direction rearwardly of the motorcycle 10, and to the drive shaft 58.

The gear transmission TM, which has the six pairs of transmission gears mounted on the main shaft 13 and the countershaft 9, is capable of selecting which pair of transmission gears is to deliver the rotational drive power from the engine 100 through a combination of the positions of transmission gears axially slidably mounted on the main shaft 13 and the countershaft 9 and the engaged and disengaged states of the first clutch CL1 and the second clutch CL2. The twin clutch assembly TCL is housed in a clutch case 4 angularly movable in unison with the primary driven gear 3. The first clutch CL1 is non-rotatably mounted on the inner main shaft 7, whereas the second clutch CL2 is non-rotatably mounted on the outer main shaft 6. Between the clutch case 4 and the first and second clutches CL1 and CL2, there are disposed clutch plates 12 including four drive friction plates non-rotatably supported on the clutch case 4 and four driven friction plates non-rotatably supported on the first and second clutches CL1 and CL2.

The first clutch CL1 and the second clutch CL2 are arranged such that when they are supplied with the hydraulic pressure from the hydraulic pump 109 (see FIG. 3), they impose frictional forces on the clutch plates 12 and are brought into the engaged state. The clutch cover 50 that is mounted on the crankcase 46 has a wall in which there is embedded an oil distributor 8 that provides two dual-tube hydraulic pressure passages connected to respective oil passages A1 and A2 defined in the inner main shaft 7. When the oil distributor 8 is supplied with the hydraulic pressure from the first valve 107a, the hydraulic pressure is supplied to the oil passage A1 thereby to slide a piston B1 of the first clutch CL1 to the left against the bias of a resilient member 11 such as a spring, bringing the clutch plates 12 into frictional engagement to engage the first clutch CL1. When the oil distributor 8 is supplied with the hydraulic pressure from the second valve 107b, the hydraulic pressure is supplied to the oil passage A2 thereby to slide a piston B2 of the second clutch CL2 to the left against the bias of a resilient member 11 such as a spring, bringing the clutch plates 12 into frictional engagement to engage the second clutch CL2. When the hydraulic pressure stops being applied to the pistons B1 and B2, the pistons B1 and B2 are returned to their initial position under the bias of the resilient members 11, releasing the clutch plates 12 out of frictional engagement to disengage the first and second clutches CL1 and CL2.

Unless the hydraulic pressure is supplied to the first clutch CL1 or the second clutch CL2, the rotational drive power from the primary driven gear 3 only rotates the clutch case 4. When the hydraulic pressure is supplied to the first clutch CL1 or the second clutch CL2, it rotates the outer main shaft 6 or the inner main shaft 7 in unison with the clutch case 4. The first clutch CL1 or the second clutch CL2 may be partly engaged by adjusting the magnitude of the hydraulic pressure supplied to the first clutch CL1 or the second clutch CL2.

The inner main shaft 7 that is connected to the first clutch CL1 supports thereon drive gears M1, M3, and M5 for the odd-numbered gear positions (first, third, and fifth gear positions). The first gear-position drive gear M1 is integrally formed with the inner main shaft 7. The third gear-position drive gear M3 is axially slidably and circumferentially non-rotatably mounted on the inner main shaft 7 by splines. The fifth gear-position drive gear M5 is axially non-slidably and circumferentially rotatably mounted on the inner main shaft 7.

The outer main shaft 6 that is connected to the second clutch CL2 supports thereon drive gears M2, M4, and M6 for the even-numbered gear positions (second, fourth, and sixth gear positions). The second gear-position drive gear M2 is integrally formed with the outer main shaft 6. The fourth gear-position drive gear M4 is axially slidably and circumferentially non-rotatably mounted on the outer main shaft 6 by splines. The sixth gear-position drive gear M6 is axially non-slidably and circumferentially rotatably mounted on the outer main shaft 6.

The countershaft 9 supports thereon driven gears C1 through C6 that are held in mesh with the drive gears M1 through M6, respectively. The driven gears C1 through C4 for the first through fourth gear positions are axially non-slidably and circumferentially rotatably mounted on the countershaft 9, whereas the driven gears C5 and C6 for the fifth and sixth gear positions are axially slidably and circumferentially non-rotatably mounted on the countershaft 9.

Of the above gear trains, the drive gears M3 and M4 and the driven gears C5 and C6, i.e., the axially slidable gears, are axially slidable in response to movement of the shift forks, as described later, and have respective engaging grooves 51, 52, 61, and 62 in which prongs of the shift forks engage. The inner main shaft rotational speed sensor 131 (see FIG. 3) serves to detect the rotational speed of the third gear-position driven gear C3, and the outer main shaft rotational speed sensor 132 serves to detect the rotational speed of the fourth gear-position driven gear C4.

The other transmission gears, i.e., the drive gears M1, M2, M5 and M6 and the driven gears C1 through C4, than the above slidable gears, i.e., the axially non-slidable gears are arranged to selectively transmit the rotational drive power to adjacent slidable gears. According to the present embodiment, the twin-clutch transmission 1 thus constructed is capable of selecting a desired pair of gears for transmitting the rotational drive power through a combination of the positions of the slidable gears and the engaged and disengaged states of the first and second clutches CL1 and CL2.

According to the present embodiment, a dog clutch mechanism is employed to transmit the rotational drive power between the slidable gears and the non-slidable gears. The dog clutch mechanism includes recessed and protruding configurations such as dog holes and dog teeth which mesh with each other to transmit the rotational drive power with a minimum of power loss. According to the present embodiment, for example, four dog teeth 55 formed on the sixth gear-position driven gear C6 engage respectively in four dog holes 35 formed in the second gear-position driven gear C2.

Figure 5:
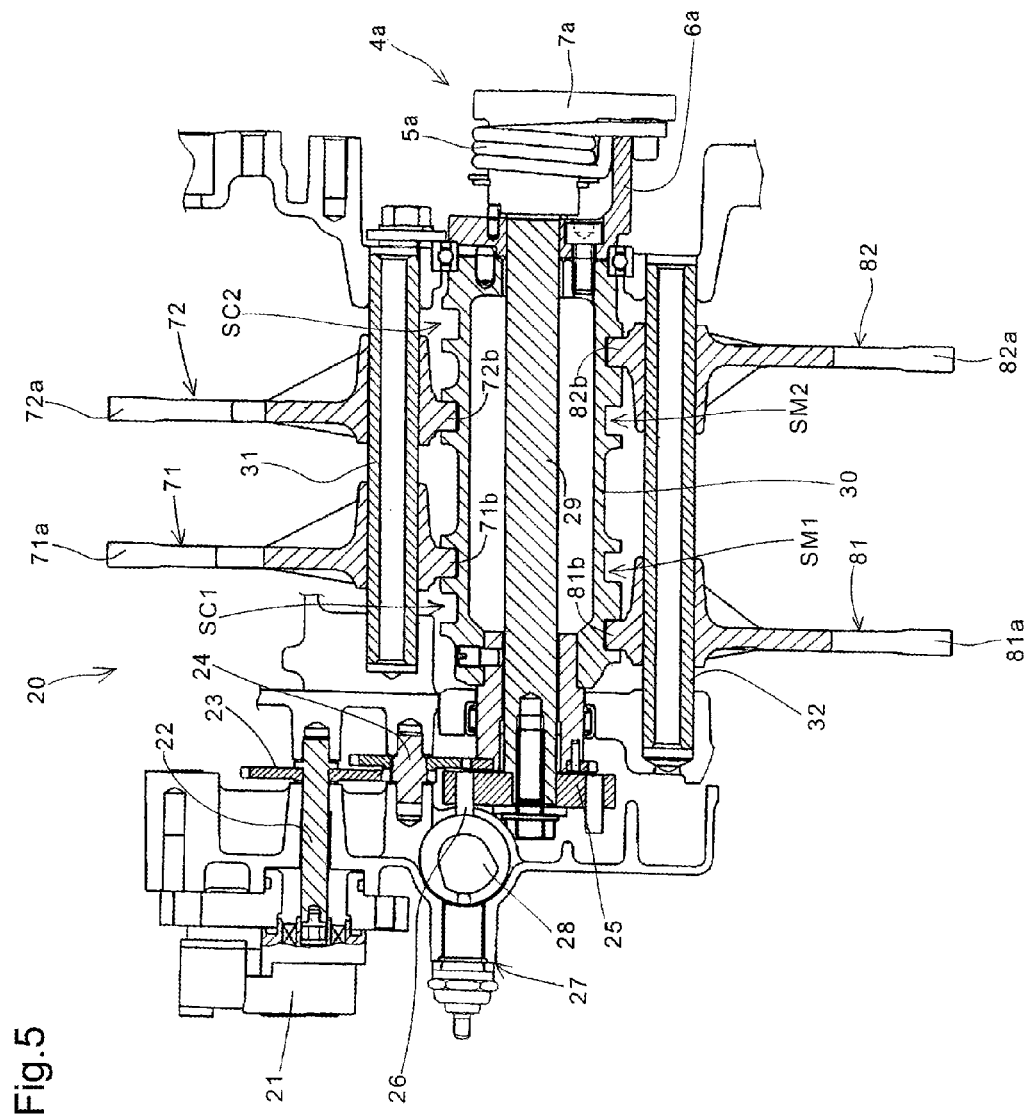
FIG. 5 is an enlarged cross-sectional view of a transmission mechanism.

FIG. 5 is an enlarged cross-sectional view of a transmission mechanism 20. The transmission mechanism 20 has four shift forks 71, 72, 81, and 82 slidably mounted on two guide shafts 31 and 32 for actuating the four slidable gears referred to above. The four shift forks 71, 72, 81, and 82 have respective guide prongs 71a, 72a, 81a, and 82a engaging the slidable gears and respective tubular tongues 71b, 72b, 81b, and 82b engaging in the guide grooves of the shift drum 30.

The shift fork 71 that engages the third gear-position drive gear M3 and the shift fork 72 that engages the fourth gear-position drive gear M4 are mounted on the guide shaft 31. The shift fork 81 that engages the fifth gear-position driven gear C5 and the shift fork 82 that engages the sixth gear-position driven gear C6 are mounted on the guide shaft 32.

The shift drum 30 that extends parallel to the guide shafts 31 and 32 has guide grooves SM1 and SM2 defined in the outer circumferential surface thereof and in which the shift forks 71 and 72 associated with the main shaft 13 engage, and guide grooves SC1 and SC2 defined in the outer circumferential surface thereof and in which the shift forks 81 and 82 associated with the countershaft 9 engage. Upon angular movement of the shift drum 30 around its own axis, the slidable gears M3, M4, C5, and C6 are axially actuated according to the configurations of the four guide grooves SM1, SM2, SC1, and SC2.

The shift drum 30 is angularly moved to predetermined angular positions by the shift control motor 21. The shift drum motor 21 transmits its rotational drive power to a shift drum shaft 29 that supports the shift drum 30 which has a hollow cylindrical shape, through a first gear 23 mounted on a rotational shaft 22 coupled to the output shaft of the shift control motor 21, a second gear 24 held in mesh with the first gear 23, and a gear mounted on the shift drum shaft 29 and held in mesh with the second gear 24. The shift drum shaft 29 is coupled to the shift drum 30 through a lost-motion mechanism 4a.

The lost-motion mechanism 4a is a mechanism wherein the shift drum shaft 29 and the shift drum 30 are coupled to each other by a torsion coil spring 5a, so that even when the dog clutch mechanism fails to engage and the shift drum 30 is not turned, the energy from the shift control motor 21 is temporarily stored by the torsion coil spring 5a to prevent an excessive load from being applied to the shift control motor 21. The lost-motion mechanism 4a includes a drive rotor 7a mounted on an end of the shift drum shaft 29, a driven rotor 6a mounted on an end of the shift drum 30, and the torsion coil spring 5a interconnecting the drive rotor 7a and the driven rotor 6a. When the shift drum 30 becomes ready to turn around its own axis while the energy from the shift control motor 21 has been temporarily stored by the torsion coil spring 5a, the shift drum 30 starts to turn under the bias of the torsion coil spring 5a.

The gear position sensor 134 (see FIG. 3) is disposed to detect the angular position of the shift drum 30 or the driven rotor 6 in order to detect an actual angular position of the shift drum 30. The shifter sensor 27 is able to detect whether the shift control motor 21 is in a predetermined angular position or not on the basis of the angular position of a cam 28 rotated by a pin 26 that is embedded in a shifter 25 fixed to the shift drum shaft 29.

Figure 6:
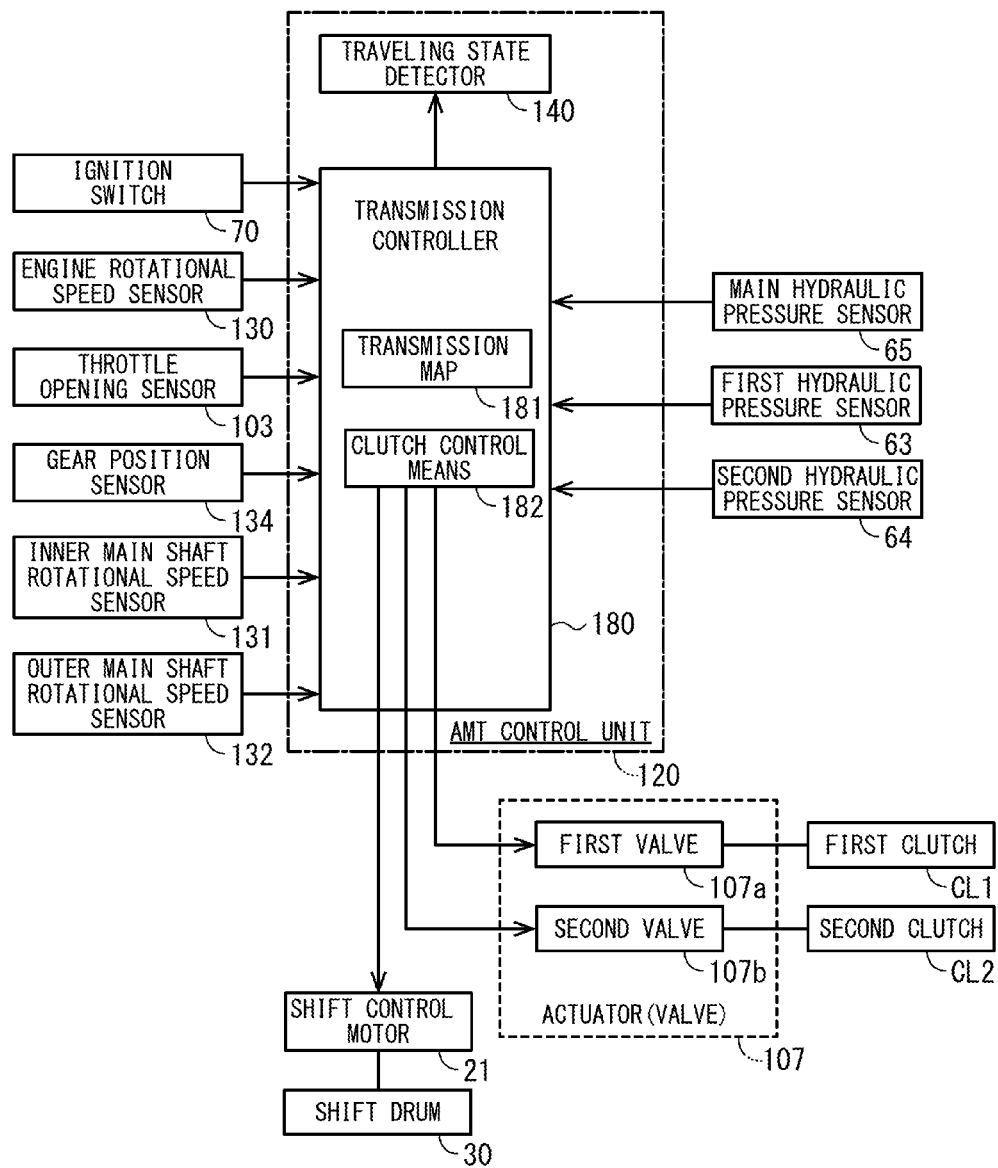
FIG. 6 is a block diagram of the AMT control unit as a clutch control device.

FIG. 6 is a block diagram of the AMT control unit 120 as a clutch control device. The AMT control unit 120 includes a transmission controller 180 including a transmission map 181 and clutch control means 182, and a traveling state detector 140. The AMT control unit 120 may be arranged as part of an electronic control unit which also controls other parts of the engine 100, etc. than those illustrated in FIG. 6.

While the motorcycle 10 is traveling normally, the transmission controller 180 actuates the shift control motor 21 and the valve 107 according to the transmission map 181, which includes a three-dimensional map or the like, on the basis of output signals from the engine rotational speed sensor 130, the throttle opening sensor 103, and the gear position sensor 134 and vehicle speed information. The vehicle speed information can be calculated on the basis of a gear position detected by the gear position sensor 134 and output signals from the inner main shaft rotational speed sensor 131 and the outer main shaft rotational speed sensor 132. The transmission controller 180 is also supplied with an output signal from an ignition switch 70 which turns on and off a main power supply of the motorcycle 10.

The traveling state detector 140 determines traveling states of the motorcycle 10 on the basis of the output signals from the various sensors which are input to the transmission controller 180. The traveling states include a state wherein the motorcycle 10 is stopping, a state wherein the motorcycle 10 is traveling, transmission gear positions, a state immediately after the engine 100 has started, etc.

When the motorcycle 10 starts to move and when it changes gear positions, the clutch control means 182 of the AMT control unit 120 according to the present embodiment actuates the valve 107 with drive signals whose PWM periods are variable depending on the degrees to which the first and second clutches CL1 and CL2 are engaged, for thereby minimizing variations of I-P characteristics under low hydraulic pressure control and also minimizing hydraulic pressure fluctuations under medium and high hydraulic pressure control to achieve good hydraulic pressure control. The I-P characteristics refer to characteristics representing the relationship between coil current values for linear solenoids of the valve 107 and the hydraulic pressures of the first and second clutches CL1 and CL2.

Specifically, as illustrated by a table shown in FIG. 7, the clutch control means 182 changes PWM periods and duty ratios (percentages of the duration of a high pulse level in the pulse period) depending on the engaged states of the first and second clutches CL1 and CL2, i.e., hydraulic pressure ranges, to control the coil drive currents for the normally closed linear solenoids of the valve 107 thereby to achieve the good hydraulic pressure control referred to above. The table shown in FIG. 7 illustrates a setting example wherein when the hydraulic pressure is low, the duty ratio is low and the PWM period is long (e.g., a period of 5.0 milliseconds and a frequency of 200 Hz), when the hydraulic pressure is medium, the duty ratio is medium and the PWM period is medium (e.g., a period of 2.5 milliseconds and a frequency of 400 Hz), and when the hydraulic pressure is high, the duty ratio is high and the PWM period is short (e.g., a period of 1.25 milliseconds and a frequency of 800 Hz).

In other words, the example shown in FIG. 7 represents three hydraulic pressure ranges, i.e., low, medium, and high hydraulic pressure ranges, that are established such that the PWM period is longer as the hydraulic pressure is lower and the PWM period is shorter as the hydraulic pressure is higher. Consequently, in the example shown in FIG. 7, as the clutches change from the disengaged state wherein the hydraulic pressure is lower toward progressively more engaged states wherein the hydraulic pressure is higher, the PWM period becomes progressively shorter. The hydraulic pressure may be set to two levels "low" and "high" with the level "medium" omitted, or may be set to four or more different levels.

The example shown in FIG. 7 also represents different PWM periods established in relation to the duty ratios of coil drive currents that are set depending on the hydraulic pressures that reflect engaged states of the clutches. As disclosed in Patent Document 1 referred to above and other documents, there has been an existing technology for varying the duty ratios of the coil drive currents depending on the hydraulic pressures while the PWM period is set to a fixed level. The present invention is also applicable in combination with such an existing technology to an arrangement for varying the PWM period in relation to the duty ratios depending on the hydraulic pressures. Specifically, using the existing technology with respect to the setting of the duty ratios depending on the hydraulic pressures, the present invention may be applied to set the PWM period to a longer value as the duty ratio is lower and set to the PWM period to a shorter value as the duty ratio is higher.

One reason for achieving the good hydraulic pressure control by controlling the coil drive currents with the settings shown in FIG. 7 is that characteristics represented by a table shown in FIG. 8 are available by changing the PWM periods of the coil drive currents for the linear solenoid valves. According to the present invention, specifically, as long as the hydraulic pressure is low and the degree to which the clutches are engaged is small, a longer PWM period is established taking advantage of being able to increase the coil drive currents quickly, and as the hydraulic pressure becomes higher and the degree to which the clutches are engaged becomes larger, a shorter PWM period is established in order to engage the clutches smoothly taking advantage of small amplitudes of the coil drive currents.

Figure 10:
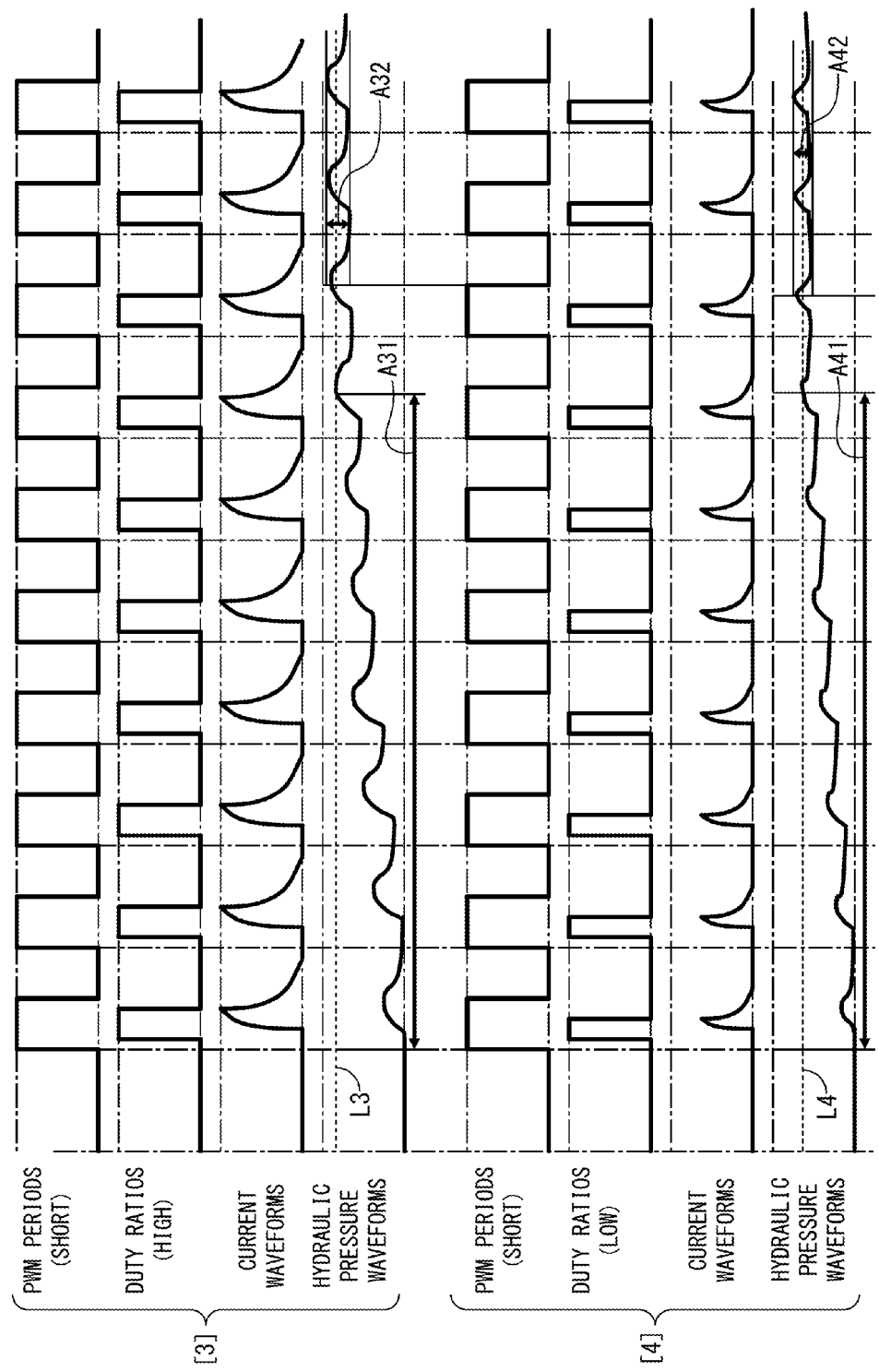
FIG. 10 is a diagram showing an example in the case where the PWM period is set high.

FIGS. 9 and 10 are schematic diagrams of examples of the characteristics of FIG. 8, showing current waveforms and hydraulic pressure waveforms depending on PWM periods and duty ratios that are established. FIG. 9 illustrates examples [1] and [2] where a longer PWM period (a lower frequency) is established, the waveforms [1] being plotted when a higher duty ratio is set and the waveform [2] being plotted when a lower duty ratio is set. In both of the examples [1] and [2], the times required to reach target hydraulic pressures indicated by the dotted lines L1 and L2 are quicker as indicated by the arrows A11 and A21, but the hydraulic pressure fluctuations after the target hydraulic pressures have been reached are larger as indicated by the arrows A12 and A22, compared with the examples shown in FIG. 10 where the PWM period is shorter, to be described below. FIG. 10 illustrates examples [3] and [4] where a shorter PWM period (a higher frequency) is established, the waveforms [3] being plotted when a higher duty ratio is set and the waveform [4] being plotted when a lower duty ratio is set. In both of the examples [3] and [4], the times required to reach target hydraulic pressures indicated by the dotted lines L3 and L4 are slower as indicated by the arrows A31 and A41, but the hydraulic pressure fluctuations after the target hydraulic pressures have been reached are smaller as indicated by the arrows A32 and A42, compared with the examples shown in FIG. 9.

Figure 11:
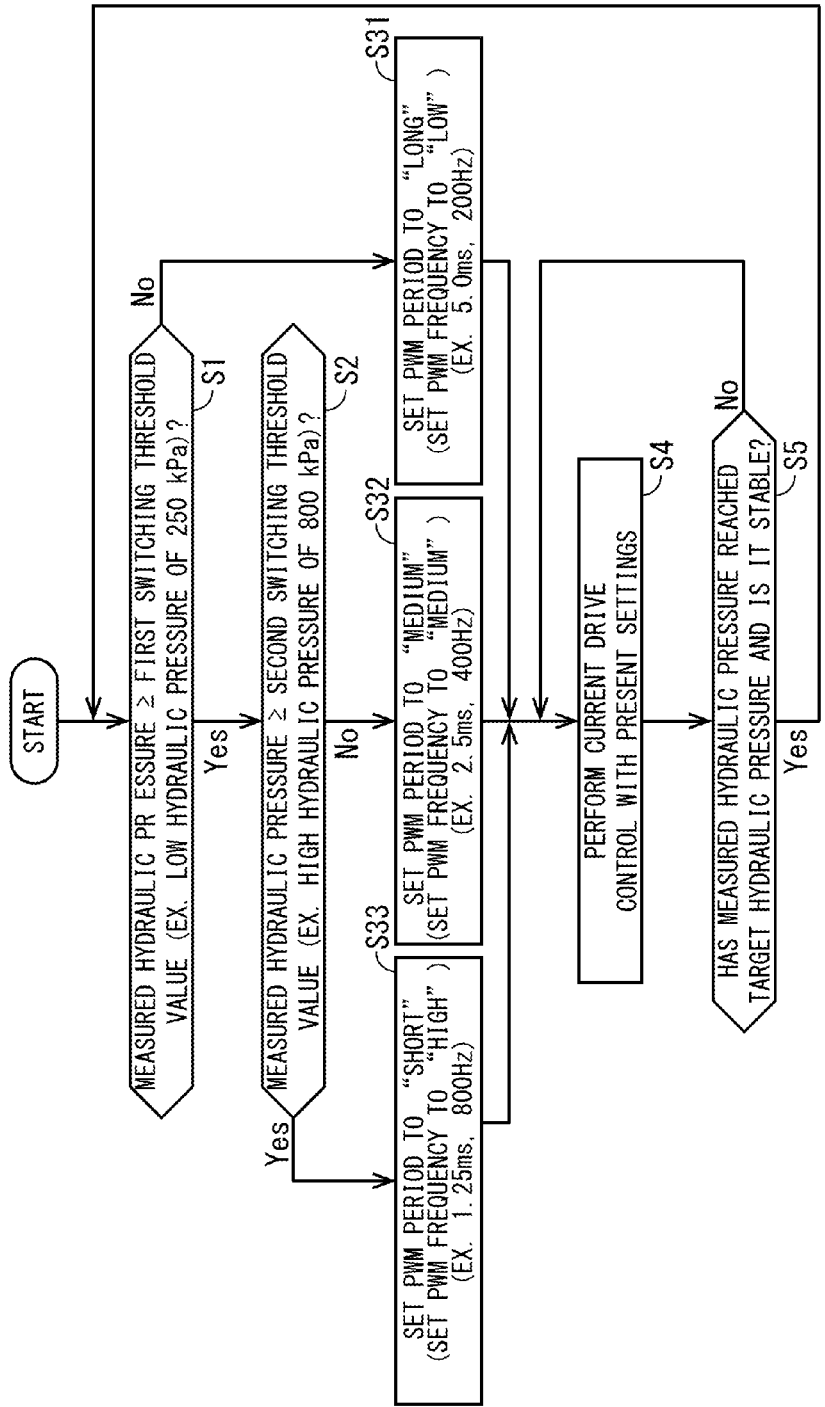
FIG. 11 is a flowchart of the method of controlling the electric current of the linear solenoid valve according to the present embodiment.

FIG. 11 is a flowchart of the method of controlling the electric current of the linear solenoid valve according to the present embodiment. The flowchart shown in FIG. 11 deals with an example where three hydraulic pressures, i.e., low, medium, and high hydraulic pressures, as shown in FIG. 7 are applied, and the coil drive currents are controlled at PWM periods corresponding to those three hydraulic pressures.

The flowchart shown in FIG. 11 is started in response to the decision made by the transmission controller 180 to start engaging one of the clutches as when the motorcycle 10 starts to move or gear positions are changed. In step S1, the transmission controller 180 determines whether or not the hydraulic pressure measured by the first hydraulic pressure sensor 63 or the second hydraulic pressure sensor 64, which corresponds to the first clutch CL1 or the second clutch CL2 to be engaged (this also applies to steps S2 and S5), is equal to or higher than a first switching threshold value. If the measured hydraulic pressure is equal to or higher than the first switching threshold value, then control goes to step S2. If the measured hydraulic pressure is lower than the first switching threshold value, then control goes to step S31. The first switching threshold value may be set to a predetermined value, e.g., 250 kPa, at the boundary between a low hydraulic pressure range and a medium hydraulic pressure range.

In step S2, the transmission controller 180 determines whether or not the hydraulic pressure measured by the first hydraulic pressure sensor 63 or the second hydraulic pressure sensor 64 is equal to or higher than a second switching threshold value. If the measured hydraulic pressure is equal to or higher than the second switching threshold value, then control goes to step S33. If the measured hydraulic pressure is lower than the second switching threshold value, then control goes to step S32. The second switching threshold value may be set to a predetermined value, e.g., 800 kPa, at the boundary between the medium hydraulic pressure range and a high hydraulic pressure range.

In step S31, since the measured hydraulic pressure is in the low hydraulic pressure range, the clutch control means 182 sets the PWM period for the coil drive current for the linear solenoid valve 107 to a long value, e.g., 5.0 milliseconds as shown in FIG. 7, and sets the target hydraulic pressure to the first switching threshold value as settings for the low hydraulic pressure range, after which control goes to step S4. In step S31, the clutch control means 182 may simultaneously set the duty ratio of the coil drive current for the linear solenoid valve 107 to a low value as a setting for the low hydraulic pressure range.

In step S32, since the measured hydraulic pressure is in the medium hydraulic pressure range, the clutch control means 182 sets the PWM period for the coil drive current for the linear solenoid valve 107 to a medium value, e.g., 2.5 milliseconds as shown in FIG. 7, and sets the target hydraulic pressure to the second switching threshold value as settings for the medium hydraulic pressure range, after which control goes to step S4. In step S32, the clutch control means 182 may simultaneously set the duty ratio of the coil drive current for the linear solenoid valve 107 to a medium value as a setting for the medium hydraulic pressure range.

In step S33, since the measured hydraulic pressure is in the high hydraulic pressure range, the clutch control means 182 sets the PWM period for the coil drive current for the linear solenoid valve 107 to a short value, e.g., 1.25 milliseconds as shown in FIG. 7, and sets the target hydraulic pressure to a predetermined value corresponding to the engaged clutch state as settings for the high hydraulic pressure range, after which control goes to step S4. In step S33, the clutch control means 182 may simultaneously set the duty ratio of the coil drive current for the linear solenoid valve 107 to a high value as a setting for the high hydraulic pressure range.

In steps S31, S32, and S33, the duty ratio may be set to constant low, medium, and high values, respectively, or may be set to values that vary depending on the hydraulic pressure within given ranges determined as low, medium, and high ranges. The duty ratio may be set by the process referred to in Patent Document 1 described above or other existing processes.

In step S4, the clutch control means 182 performs a current drive control process for actuating the linear solenoid valve 107 based on the present settings of the coil drive current and target hydraulic pressure. Then, control goes to step S5. In step S5, the transmission controller 180 determines whether the hydraulic pressure measured by the first hydraulic pressure sensor 63 or the second hydraulic pressure sensor 64 has reached the target hydraulic pressure and is stable or not, i.e., whether fluctuations of the hydraulic pressure over a predetermined period of time in the past fall within a given range across the target hydraulic pressure or not. If the answer is affirmative, then control goes back to step S1. If the answer is negative, then control goes back to step S4 in which the clutch control means 182 continues the current drive control process for actuating the linear solenoid valve 107 in a next cycle.

Figure 12:
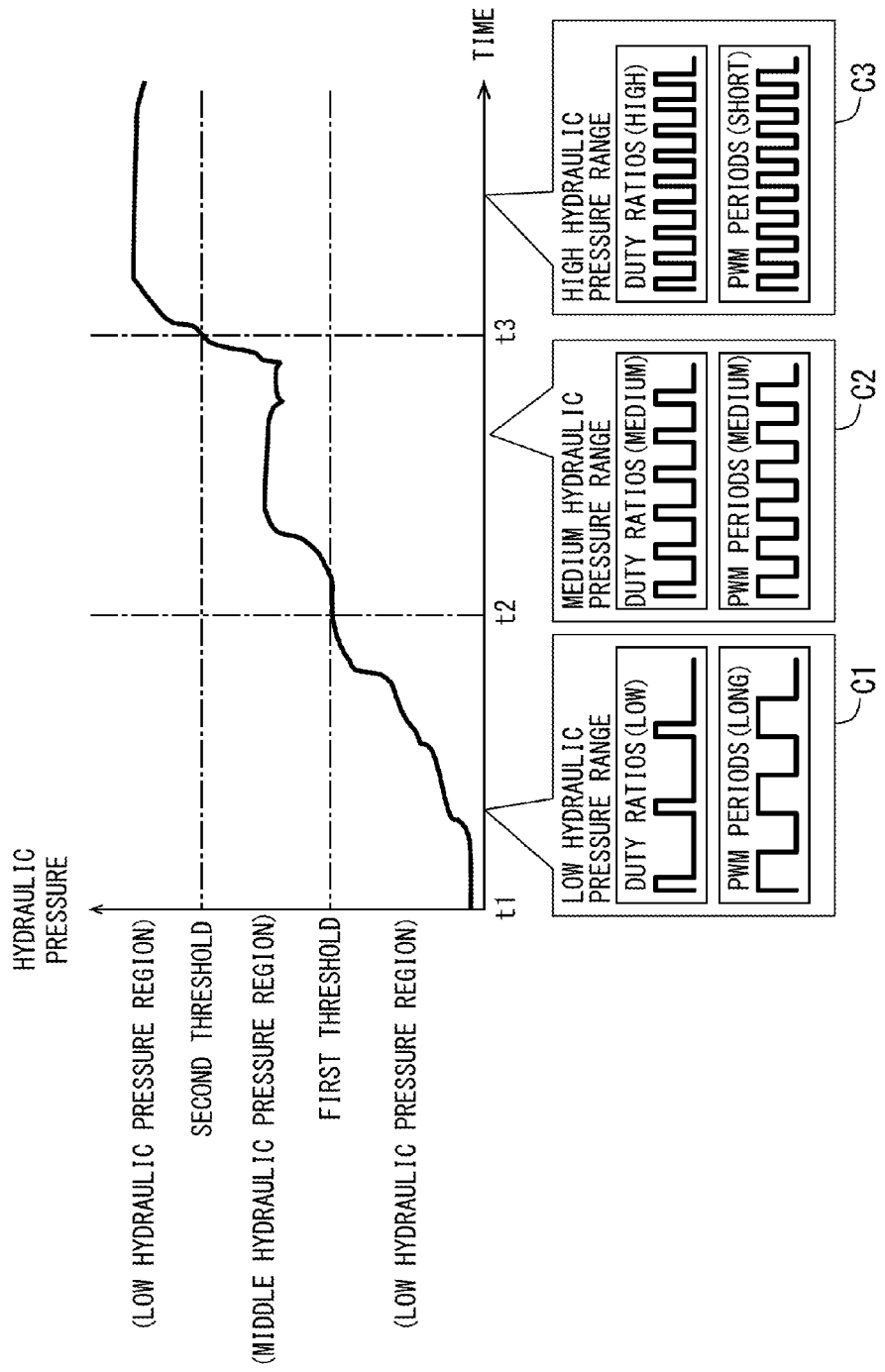
FIG. 12 is a schematic diagram showing an example of time-dependent variations of the hydraulic pressure in the current drive control process carried out on the linear solenoid valve according to the flowchart shown in FIG. 11.

FIG. 12 is a schematic diagram showing an example of time-dependent variations of the hydraulic pressure detected by the first hydraulic pressure sensor 63 or the second hydraulic pressure sensor 64 in the current drive control process carried out on the linear solenoid valve 107 according to the flowchart shown in FIG. 11. In FIG. 12, time t1 represents the time at which the current drive control process starts to be carried out. Between time t1 and time t2, the hydraulic pressure is in the low hydraulic pressure range, and the current drive control process is performed in which the target hydraulic pressure is set to the first switching threshold value, the PWM period is set to a long value, and the duty ratio is set to a low value, as indicated by a column C1. At time t2, the hydraulic pressure is determined as having reached the first switching threshold value and being stable. Between time t2 and time t3, the hydraulic pressure is in the medium hydraulic pressure range, and the current drive control process is performed in which the target hydraulic pressure is set to the second switching threshold value, the PWM period is set to a medium value, and the duty ratio is set to a medium value, as indicated by a column C2. At time t3, the hydraulic pressure is determined as having reached the second switching threshold value and being stable. After time t3, the hydraulic pressure is in the high hydraulic pressure range, and the current drive control process is performed in which the target hydraulic pressure is set to a predetermined value corresponding to the engaged clutch state, the PWM period is set to a short value, and the duty ratio is set to a high value, as indicated by a column C3. After the hydraulic pressure has reached a certain value, it is kept generally stable. The columns C1 through C3 schematically show examples of duty ratio waveforms and PWM waveforms set as described above.

As schematically shown in FIG. 12, the method of controlling the electric current of the linear solenoid valve according to the present invention is capable of minimizing variations of I-P characteristics under low hydraulic pressure control and also minimizing hydraulic pressure fluctuations under medium and high hydraulic pressure control to achieve good hydraulic pressure control.

Supplementary explanations (1) and (2) of the present invention will be given below.

Figure 13:
FIG. 13 is a diagram showing a table illustrative of an example in which a PWM period and a duty ratio are set depending on a hydraulic pressure with respect to a normally open linear solenoid valve, in comparison with the example shown in FIG. 7 where the normally closed linear solenoid valve is used.

(1) In the above description, the linear solenoid valve 107 is normally closed and can be opened when energized by electric currents. However, the present invention is also applicable to a normally open linear solenoid valve. If a normally open linear solenoid valve is used, as shown in FIG. 13, the duty ratio is set to lower values and the PWM period is set to shorter values as the degree to which the clutches are engaged increases from the disengaged state thereof. FIG. 13 shows an example of settings for the normally open linear solenoid valve, which correspond to those of the PWM period and the duty ratio for the normally closed linear solenoid valve 107 shown in FIG. 7.

(2) The PWM period that is variable according to the present invention should preferably be set in synchronism with the period of the control process carried out for the clutch (the first clutch CL1 and the second clutch CL2) by the clutch control means 180 as the electronic control unit, i.e., the period of the hydraulic pressure control process performed for the valve 107 with feedback and feed-forward input and output signals.

Such a synchronization can be accomplished by equalizing a multiple by a natural number of the period of the hydraulic pressure control process to the PWM period. For example, provided the PWM period is 4 milliseconds, then a synchronization cannot be accomplished if the period of the hydraulic pressure control process is 5 milliseconds, but a synchronization can be accomplished if the period of the hydraulic pressure control process is 2 milliseconds because twice the period of the hydraulic pressure control process is equal to the PWM period. In the setting example shown in FIG. 7 where the PWM period is variable (5.0 milliseconds, 2.5 milliseconds, and 1.25 milliseconds), a synchronization can be constantly accomplished if the period of the hydraulic pressure control process is 1.25 milliseconds, for example.

By setting the PWM period in synchronism with the period of the hydraulic pressure control process, it is possible to perform the hydraulic pressure control process with feedback and feed-forward input and output signals in synchronism with the PWM period, on the hydraulic pressure that varies in a manner to reflect the PWM period, using the linear solenoid valve 107 that is current-driven by PWM, for thereby increasing the accuracy of digital control and minimizing variations of clutch volume control (If the PWM period is not in synchronism with the period of the hydraulic pressure control process, e.g., if the PWM period is 4 milliseconds and the period of the hydraulic pressure control process is 5 milliseconds, then feedback and feed-forward input signals indicative of the hydraulic pressure that varies in a manner to reflect the period of 4 milliseconds are periodically missed.

REFERENCE SIGNS LIST

CL1, CL2 . . . hydraulic clutch,
107a, 107b . . . linear solenoid valve,
182 . . . clutch control means,
63, 64 . . . hydraulic pressure sensor,
100 . . . power source,
WR . . . drive wheel

The invention claimed is:

1. A method of controlling an electric current of a linear solenoid valve by performing, pulse width modulation on a coil current for energizing a linear solenoid of the linear solenoid valve which is open when energized to adjust the hydraulic pressure of a working oil in a hydraulic clutch for transmitting and interrupting rotational drive power from a power source to a drive wheel of a vehicle, the method comprising:
setting a duty ratio to a higher value and setting a period of the pulse width modulation to a shorter value as the degree to which said hydraulic clutch is engaged increases from a disengaged state thereof.

2. A method of controlling an electric current of a normally open linear solenoid valve by performing pulse width modulation on a coil current for energizing a linear solenoid of the linear solenoid valve which is closed when energized to adjust the hydraulic pressure of a working oil in a hydraulic clutch for transmitting and interrupting rotational drive power from a power source to a drive wheel of a vehicle, the method comprising:
setting a duty ratio to a lower value and setting a period of the pulse width modulation to a shorter value as the degree to which said hydraulic clutch is engaged increases from a disengaged state thereof.

3. The method of controlling the electric current of the linear solenoid valve according to claim 2, wherein said period of the pulse width modulation and said duty ratio are set depending on a hydraulic pressure of the working oil in the hydraulic clutch.

4. The method of controlling the electric current of the linear solenoid valve according to claim 3, wherein said period of the pulse width modulation and said duty ratio are set stepwise to predetermined period values and duty ratio values in respective given ranges of the hydraulic pressure of the working oil in the hydraulic clutch.

5. The method of controlling the electric current of the linear solenoid valve according to claim 1, wherein the period of the pulse width modulation which is set to the shorter value as the degree to which said hydraulic clutch is engaged increases is set in synchronism with a predetermined control period in an electronic control unit which controls operation of said hydraulic clutch.

6. The method of controlling the electric current of the linear solenoid valve according to claim 2, wherein the period of the pulse width modulation which is set to the shorter value as the degree to which said hydraulic clutch is engaged increases is set in synchronism with a predetermined control period in an electronic control unit which controls operation of said hydraulic clutch.

* * * * *